United States Patent [19]

Ozaki

[11] Patent Number: 4,709,269

[45] Date of Patent: Nov. 24, 1987

[54] NOISE REDUCTION CIRCUIT FOR VIDEO SIGNAL

[75] Inventor: Hidetoshi Ozaki, Chofu, Japan

[73] Assignee: Victor Company of Japan, Ltd., Yokohama, Japan

[21] Appl. No.: 15,042

[22] Filed: Feb. 17, 1987

[30] Foreign Application Priority Data

Feb. 18, 1986 [JP] Japan .................................. 61-33625

[51] Int. Cl.$^4$ ............................................ H04N 5/213
[52] U.S. Cl. ...................................... 358/167; 358/36; 455/306
[58] Field of Search .......................... 358/167, 36, 905; 455/296, 303, 304, 305, 306, 307, 308, 309

[56] References Cited

U.S. PATENT DOCUMENTS

| 4,216,570 | 8/1980 | Nakagaki | 358/36 |
| 4,563,704 | 1/1986 | Hirota | 358/36 |
| 4,646,153 | 2/1987 | Fukuda | 358/167 |
| 4,652,922 | 3/1987 | Ozaki | 358/167 |

Primary Examiner—Tommy P. Chin
Attorney, Agent, or Firm—Michael N. Meller

[57] ABSTRACT

A noise reduction circuit for video signal comprises first through third circuits each for obtaining from an input video signal a high frequency component including a noise component and for limiting large amplitude parts thereof, where a filter part of the second circuit has an impulse response characteristic wherein an amplitude increases or decays with time and is complementary to that of a filter part of the first circuit and a filter part of the third circuit has an impulse response characteristic which is essentially a combination of the two impulse response characteristics, and a fourth circuit for carrying out a subtraction between the input video signal and an output signal of the first circuit so as to obtain a first signal which is substantially eliminated of the noise component except for a noise component and distortion remaining at parts in vicinities of rises and falls in the video signal caused by the amplitude limitation carried out in the first circuit, carrying out a subtraction between output signals of the second and third circuits so as to obtain a second signal which includes the noise component and the waveform distortion of the first signal with an inverted phase, and for adding the first and second signals so as to produce an output video signal which has been substantially eliminated of all the noise component.

10 Claims, 17 Drawing Figures

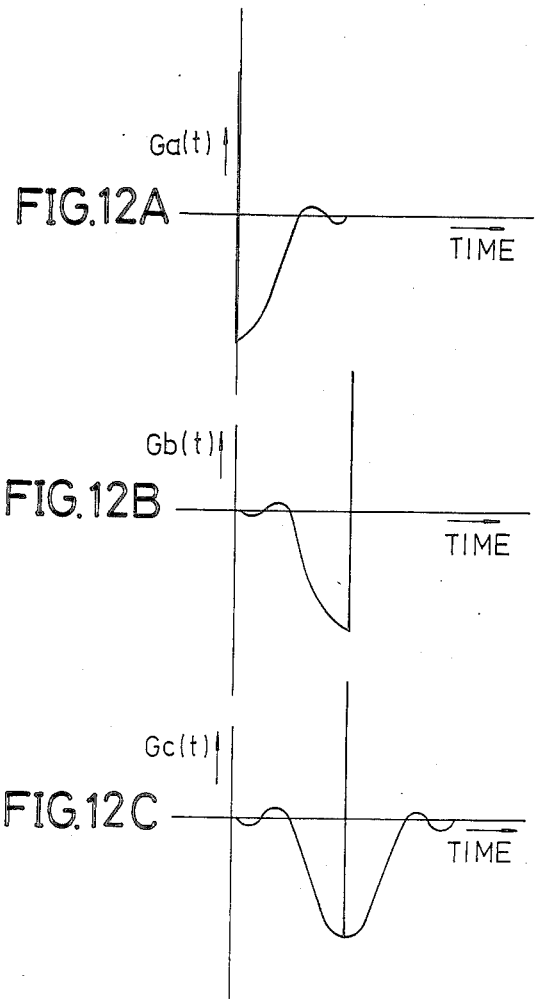
FIG.12A
FIG.12B
FIG.12C
FIG.13
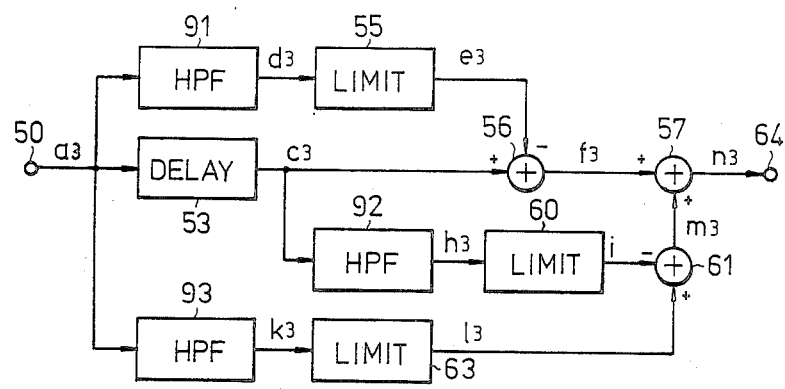

NOISE REDUCTION CIRCUIT FOR VIDEO SIGNAL

BACKGROUND OF THE INVENTION

The present invention generally relates to noise reduction circuits for video signal, and more particularly to a noise reduction circuit which can effectively eliminate a noise component existing in a luminance signal of a reproduced video signal.

Generally, a noise component is mixed in a video signal which is reproduced from a recording medium in a video signal recording and reproducing apparatus such as a magnetic recording and reproducing apparatus (so-called video tape recorder) which plays a magnetic tape. However, in a recording system of the magnetic recording and reproducing apparatus, especially a high frequency component of a luminance signal of the video signal which is recorded and reproduced is subjected to a pre-emphasis and then to a frequency modulation. For this reason, the frequency of a frequency modulated signal especially at a part immediately after a part (rise) where the luminance signal rapidly changes from a black level to a white level and at a part immediately after a part (fall) where the luminance signal rapidly changes from a white level to a black level is high because of the pre-emphasis carried out in the recording system. But in a general magnetic recording and reproducing apparatus, a signal-to-noise (S/N) ratio of a recording and reproducing characteristic is poor in a high frequency range. Hence, the S/N ratio is poor at the parts immediately after the rise and immediately after the fall in the luminance signal, and it is desirable to positively eliminate the noise component existing at such parts of the luminance signal.

As one example of the conventional noise reduction circuit, there is a first noise reduction circuit comprising a lowpass filter, first and second subtracting circuits and a limiter. An input luminance signal including a noise component is supplied to the lowpass filter and to the first and second subtracting circuits. An output signal of the lowpass filter is subtracted from the input luminance signal in the first subtracting circuit, and an output signal of the first subtracting circuit is supplied to the limiter. An output signal of the limiter is subtracted from the input luminance signal in the second subtracting circuit, and an output signal of the second subtracting circuit is obtained as an output of the noise reduction circuit.

However, as will be described later on in the present specification in conjunction with the drawings, the first noise reduction circuit suffers a disadvantage in that it is impossible to eliminate the noise component existing at the parts immediately after the rise and immediately after the fall in the luminance signal. The S/N ratio is poor at the parts immediately after the rise and immediately after the fall in the luminance signal as described before, and it is desirable to positively eliminate the noise component existing at such parts of the luminance signal.

On the other hand, as another example of the conventional noise reduction circuit, there is a second noise reduction circuit previously proposed in a U.S. Pat. No. 4,652,922 filed Dec. 26, 1985 in which the applicant is the same as the applicant of the present application. The second noise reduction circuit comprises first and second circuit parts each having a circuit construction similar to that of the first noise reduction circuit described before. The first and second circuit parts are coupled in series so that the output signal of the first circuit part (that is, the output signal of the second subtracting circuit in the first circuit part) is supplied to the second circuit part (that is, the lowpass filter in the second circuit part), and the output signal of the second subtracting circuit in the second circuit part is obtained as an output of the second noise reduction circuit. The lowpass filter in the second circuit part has an impulse response characteristic complementary to that of the lowpass filter in the first circuit part.

As will be described later in conjunction with the drawings, the second noise reduction circuit can eliminate the noise component existing at the parts immediately after the rise and immediately after the fall in the luminance signal. However, although the noise component is satisfactorily eliminated, there is a problem in that the waveform of the luminance signal becomes distorted in the vicinities of the rise and fall thereof when the noise reduction is carried out in the second noise reduction circuit.

SUMMARY OF THE INVENTION

Accordingly, it is a general object of the present invention to provide a novel and useful noise reduction circuit for video signal in which the problems described heretofore are eliminated.

Another and more specific object of the present invention is to provide a noise reduction circuit comprising first circuit means supplied with an input video signal including a noise component and comprising a first filter circuit for obtaining from the input video signal a high frequency component including the noise component and a first limiter for limiting large amplitude parts of an output signal of the first filter circuit, where the first filter circuit has a first impulse response characteristic, second circuit means supplied with the input video signal and comprising a second filter circuit for obtaining from the input video signal a high frequency component including the noise component and a second limiter for limiting large amplitude parts of an output signal of the second filter circuit, where the second filter circuit has a second impulse response characteristic wherein an amplitude increases or decays with time and is complementary to the first impulse response characteristic, a third circuit means supplied with the input video signal and comprising a third filter circuit for obtaining from the input video signal a high frequency component including the noise component and a third limiter for limiting large amplitude parts of an output signal of the third filter circuit, where the third filter circuit has a third impulse response characteristic wherein an amplitude increases with time and thereafter decays and is essentially a combination of the first and second impulse response characteristics and the first through third limiters have identical threshold levels, and fourth circuit means supplied with the input video signal and output signals of the first through third circuit means for carrying out a subtraction between the input video signal and the output signal of the first circuit means so as to obtain a first signal which is substantially eliminated of the noise component except for a noise component and distortion remaining at parts in vicinities of rises and falls in the video signal caused by the first limiter, carrying out a subtraction between the output signals of the second and third circuit means so as to obtain a second signal which includes the noise component and the waveform distortion of the first signal with an inverted phase, and for adding the first and second signals so as to produce an output video signal which has been substantially eliminated of all the noise component.

According to the noise reduction circuit of the present invention, it is possible to eliminate the noise component included in the input video signal by the first through fourth circuit means, without generating waveform distortions at parts immediately before and after rises and falls in the input video signal.

Other objects and further features of the present invention will be apparent from the following detailed description when read in conjunction with the accompanying drawings.

BRIEF DESCRIPTION OF THE DRAWINGS

FIGS. 12A through 12C respectively show impulse response characteristics of highpass filters in the circuit shown in FIG. 11; and FIG. 13 is a system block diagram showing a fourth embodiment of the noise reduction circuit according to the present invention.

DETAILED DESCRIPTION

Figure 1:
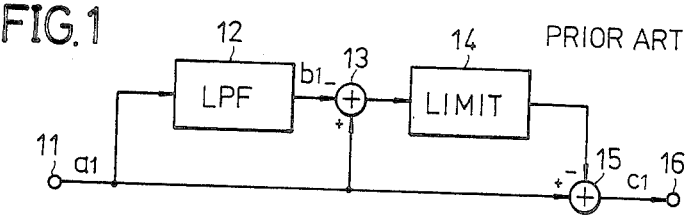
FIGS. 1 and 2 are system block diagrams respectively showing first and second examples of the conventional noise reduction circuit.
Figure 3:
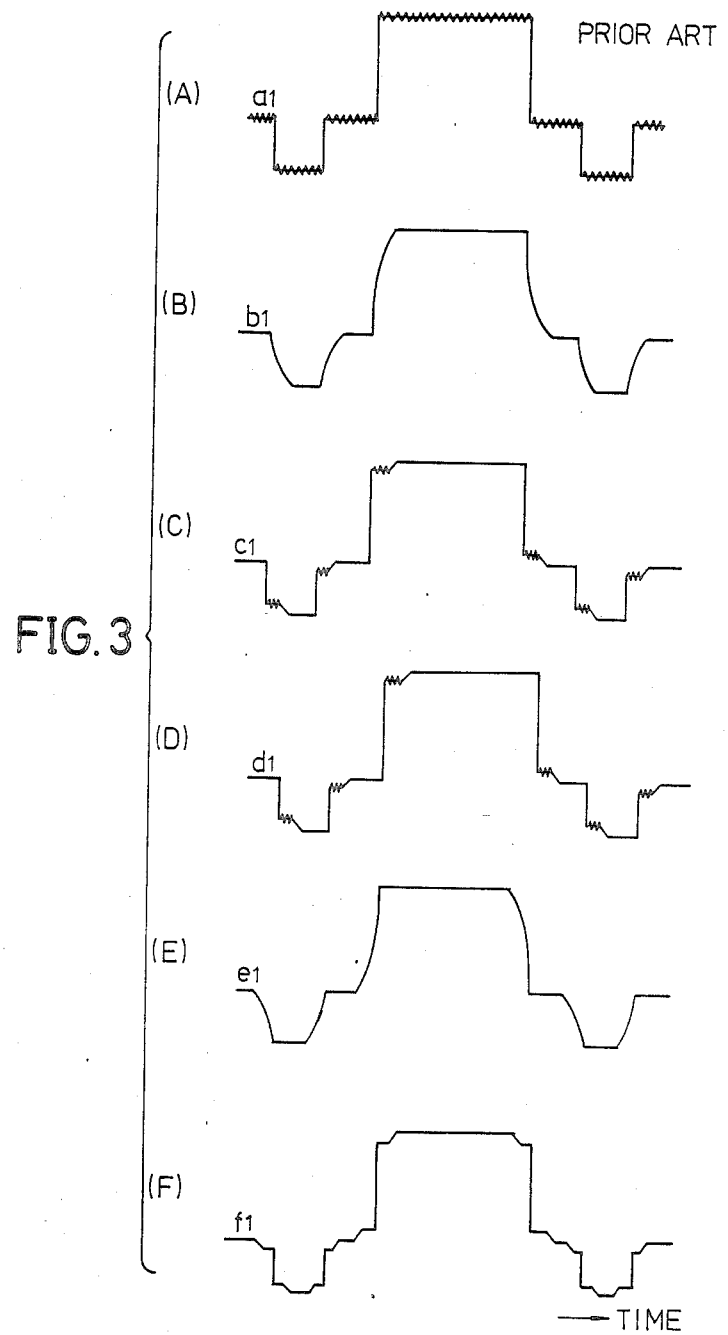
FIG. 3 shows signal waveforms for explaining the operation of the circuits shown in FIGS. 1 and 2.

FIG. 1 shows a first example of the conventional noise reduction circuit. An input luminance signal $a_1$ including a noise component as shown in FIG. 3(A) is applied to an input terminal 11. For example, the input luminance signal $a_1$ is obtained by reproducing a frequency modulated signal from a recording medium and frequency-demodulating the reproduced frequency modulated signal. A lowpass filter 12 produces a signal $b_1$ shown in FIG. 3(B) from the input luminance signal $a_1$, and this signal $b_1$ is subtracted from the input luminance signal $a_1$ in a first subtracting circuit 13. An output signal of the first subtracting circuit 13 is passed through a limiter 14 which limits the amplitude thereof, and an output signal of the limiter 14 is subtracted from the input luminance signal $a_1$ in a second subtracting circuit 15. As a result, a luminance signal $c_1$ shown in FIG. 3(C) is produced from the second subtracting circuit 15 and is obtained via an output terminal 16.

But according to the circuit shown in FIG. 1, it is impossible to eliminate the noise component from the luminance signal $c_1$ in a time period in which the limiter 14 carries out the amplitude limitation, and the noise component remains at parts immediately after the rise and immediately after the fall in the luminance signal $c_1$ as shown in FIG. 3(C). As described before, the S/N ratio is poor at the parts immediately after the rise and immediately after the fall in the luminance signal, and it is desirable to positively eliminate the noise component existing at such parts of the luminance signal.

Figure 2:
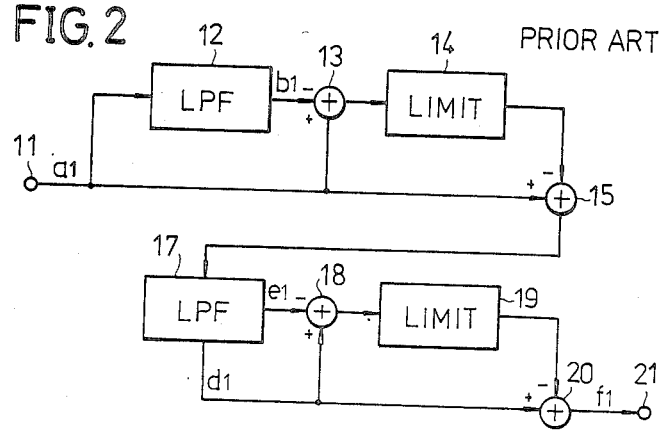

FIG. 2 shows a second example of the conventional noise reduction circuit previously proposed in the U.S. patent application Ser. No. 813,592 referred to before. In FIG. 2, those parts which are the same as those corresponding parts in FIG. 1 are designated by the same reference numerals, and description thereof will be omitted. The circuit shown in FIG. 2 comprises first and second circuit parts each having a circuit construction similar to that of the noise reduction circuit shown in FIG. 1. The first and second circuit parts are coupled in series so that the output signal of the first circuit part (that is, the output signal of the second subtracting circuit 15 in the first circuit part) is supplied to the second circuit part (that is, a lowpass filter 17 in the second circuit part), and an output signal of the second subtracting circuit 20 in the second circuit part is obtained as an output of the second noise reduction circuit via an output terminal 21. The lowpass filter 17 in the second circuit part has an impulse response characteristic complementary to that of the lowpass filter 12 in the first circuit part.

Hence, the lowpass filter 17 produces a luminance signal $d_1$ shown in FIG. 3(D) by delaying the incoming luminance signal $c_1$ by a predetermined delay time and supplies this luminance signal $d_1$ to subtracting circuits 18 and 20. Furthermore, the lowpass filter 17 produces a signal $e_1$ shown in FIG. 3(E) which is supplied to the subtracting circuit 18. The subtracting circuit 18 subtracts the signal $e_1$ from the luminance signal $d_1$ and supplies a resulting signal to a limiter 19. An output signal of the limiter 19 is subtracted from the luminance signal $d_1$ in the subtracting circuit 20. Hence, a luminance signal $f_1$ shown in FIG. 3(F) having the noise components immediately after the rise and fall of the luminance signal effectively eliminated is produced from the subtracting circuit 20 and is obtained via the output terminal 21.

However, although the noise component is satisfactorily eliminated, there is a problem in that the waveform of the luminance signal becomes distorted in the vicinities of the rise and fall thereof as shown in FIG. 3(F) when the noise reduction is carried out in the noise reduction circuit shown in FIG. 2.

The present invention eliminates the problems of the above described conventional circuits by eliminating the noise component without introducing distortion in the signal waveform.

Figure 4:
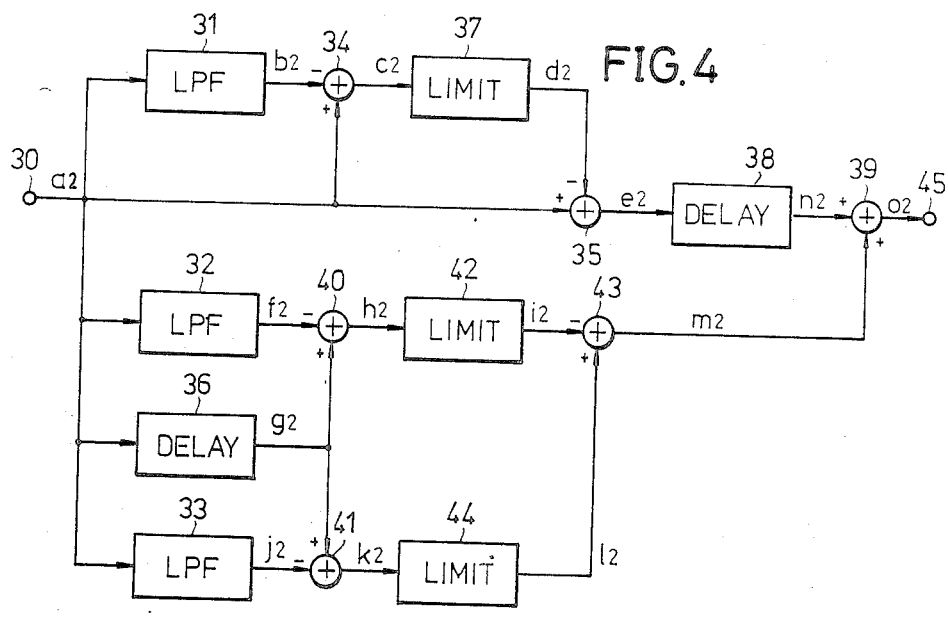
FIG. 4 is a system block diagram showing a first embodiment of the noise reduction circuit according to the present invention.
Figure 5:
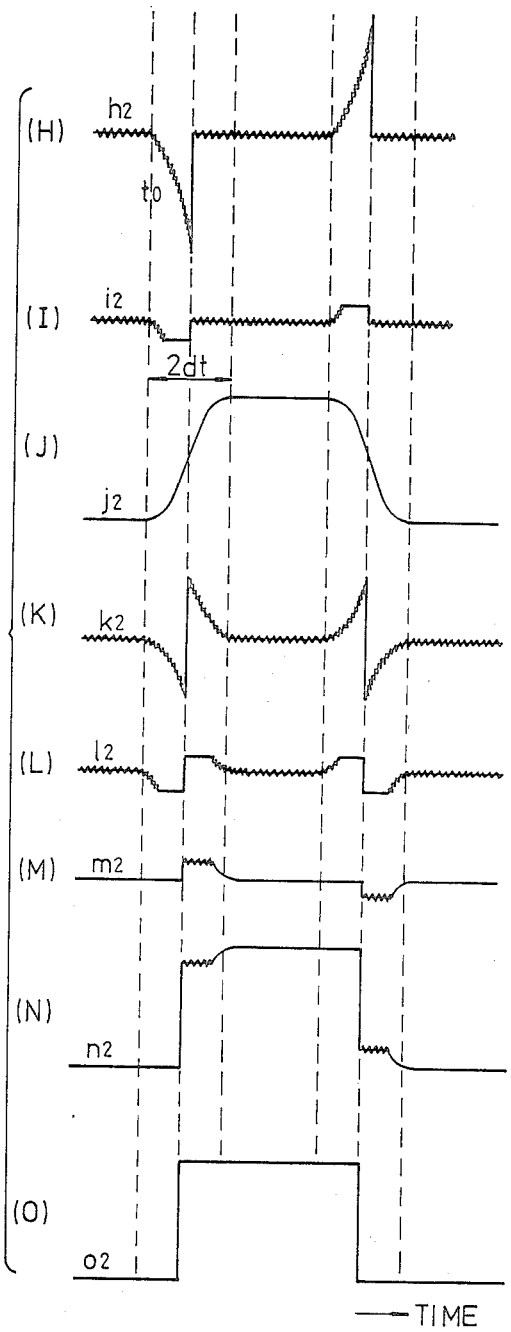
FIG. 5 show signal waveforms for explaining the operation of the circuit shown in FIG. 4.

FIG. 4 shows a first embodiment of the noise reduction circuit according to the present invention. An input luminance signal $a_2$ which includes a noise component and rises at a time t0 as shown in FIG. 5(A) is applied to an input terminal 20. As described before, the input luminance signal $a_2$ is obtained by reproducing a frequency modulated signal from a recording medium and frequency-demodulating the reproduced frequency modulated signal, for example. The input luminance signal a2 is supplied to lowpass filters 31, 32 and 33, subtracting circuits 34 and 35, and a delay circuit 36.

Figure 6A:
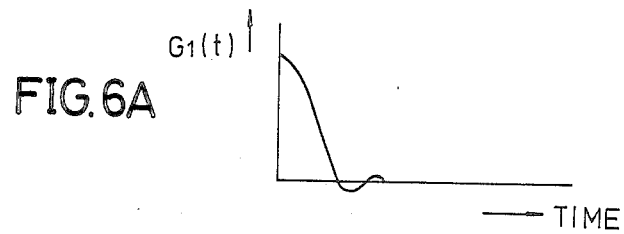
FIGS. 6A through 6C respectively show impulse response characteristics of lowpass filters in the circuit shown in FIG. 4.

The lowpass filter 31 has an impulse response characteristic G1(t) shown in FIG. 6A in which the amplitude decays with time, and produces a signal b2 shown in FIG. 5(B) which is supplied to the subtracting circuit 34. The subtracting circuit 34 subtracts the signal b2 from the input luminance signal a2 and produces a signal c2 shown in FIG. 5(C). A limiter 37 limits the amplitude of the signal c2 and supplies to the subtracting circuit 35 a signal d2 shown in FIG. 5(D). The lowpass filter 31, the subtracting circuit 34 and the limiter 37 constitute a first circuit. The subtracting circuit 35 subtracts the signal d2 from the input luminance signal a2 and produces a signal e2 shown in FIG. 5(E). The signal e2 is delayed by a predetermined delay time in a delay circuit 38, and a signal n2 shown in FIG. 5(N) from the delay circuit 38 is supplied to an adder 39. The delay time of the delay circuit 38 is identical to a delay time dt of the lowpass filter 31.

Figure 6B:
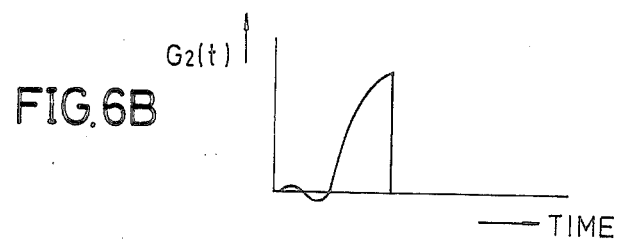

The lowpass filter 32 has an impulse response characteristic G2(t) shown in FIG. 6B in which the amplitude increases with time, and produces a signal f2 shown in FIG. 5(F) which is supplied to a subtracting circuit 40. This impulse response characteristic G2(t) is complementary to the impulse response characteristic G1(t) of the lowpass filter 31. The delay circuit 36 delays the input luminance signal a2 by the delay time dt and produces a signal g2 shown in FIG. 5(G) which is supplied to subtracting circuits 40 and 41. The subtracting circuit 40 subtracts the signal f2 from the signal g2 and produces a signal h2 shown in FIG. 5(H). A limiter 42 limits the amplitude of the signal h2 and produces a signal i2 shown in FIG. 5(I) which is supplied to a subtracting circuit 43. A threshold level of the amplitude limitation in the limiter 42 is the same as that of the limiter 37. The lowpass filter 32, the delay circuit 36, the subtracting circuit 40 and the limiter 42 constitute a second circuit.

Figure 6C:
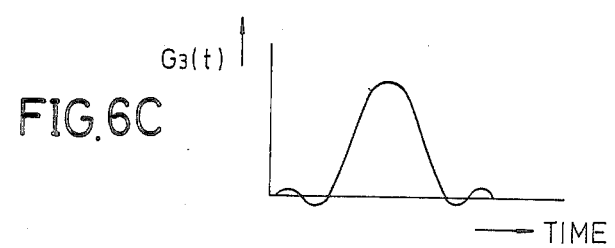

The lowpass filter 33 has an impulse response characteristic G3(t) shown in FIG. 6C in which the amplitude increases with time similarly to the impulse response characteristic G2(t) of the lowpass filter 32 and the amplitude thereafter decays similarly to the impulse response characteristic G1(t) of the lowpass filter 31. The lowpass filter 33 produces a signal j2 shown in FIG. 5(J) from the input luminance signal a2 and supplies the signal j2 to the subtracting circuit 41. The subtracting circuit 41 subtracts the signal j2 from the signal g2 and produces a signal k2 shown in FIG. 5(K). A limiter 44 limits the amplitude of the signal k2 and produces a signal l2 shown in FIG. 5(L) which is supplied to the subtracting circuit 43. A threshold level of the amplitude limitation in the limiter 44 is the same as that of the limiter 37. The lowpass filter 33, the delay circuit 36, the subtracting circuit 41 and the limiter 44 constitute a third circuit.

The subtracting circuit 43 subtracts the signal i2 from the signal l2 and produces a signal m2 shown in FIG. 5(M). The signal m2 is added to the signal n2 in the adder 39, and a luminance signal o2 which has been eliminated of the noise component and has no waveform distortion as shown in FIG. 5(O) is produced from the adder 39 and is obtained via an output terminal 45. The subtracting circuits 35 and 43, the adder 39 and the delay circuit 38 constitute a fourth circuit.

Therefore, according to the present embodiment, the output signal d2 of the first circuit and the input luminance signal a2 are subjected to a subtraction and to a delay in the fourth circuit, so as to obtain the signal n2. The signal n2 includes at a part immediately after the edges thereof the noise component and the waveform distortion caused by the limiter 37. However, the output signal i2 of the second circuit is subtracted from the output signal l2 of the third circuit in the fourth circuit so as to obtain the signal m2 which includes the noise component and the waveform distortion of the signal n2 with an inverted phase. Furthermore, the fourth circuit adds the signal n2 and the signal m2 so as to obtain the luminance signal o2 which has been eliminated of the noise component and has no waveform distortion. In other words, the fourth circuit carries out a subtraction between the input luminance signal and the output signal of the first circuit so as to obtain the signal n2 which is substantially eliminated of the noise component except for the noise component and distortion remaining at the parts immediately after the rise and immediately after the fall in the luminance signal caused by the limiter 37, carries out a subtraction between the output signals of the second and third circuits so as to obtain the signal m2 which includes the noise component and the waveform distortion of the signal n2 with the inverted phase, and adds the signals n2 and m2 so as to produce the luminance signal o2 which has been eliminated of the noise component and has no waveform distortion.

Figure 7:
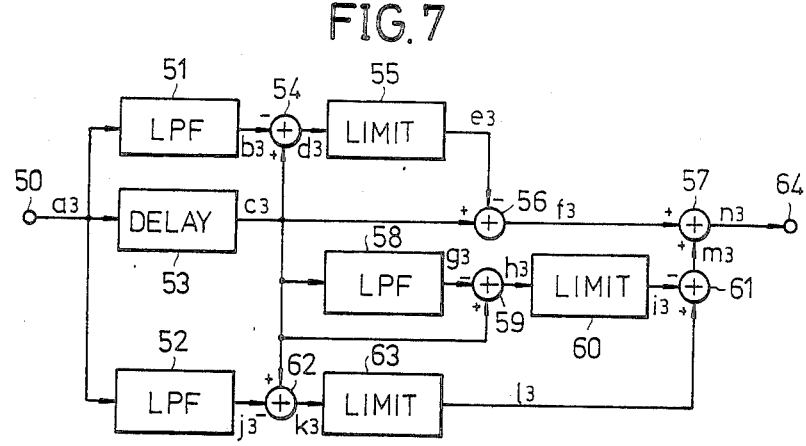
FIG. 7 is a system block diagram showing a second embodiment of the noise reduction circuit according to the present invention.
Figure 8:
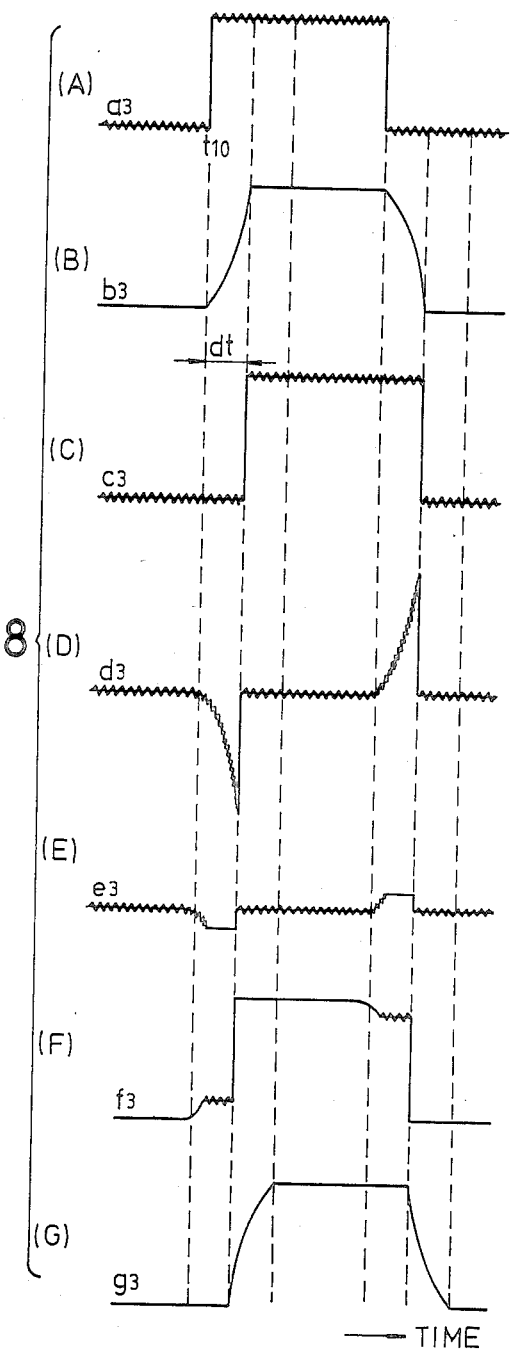
FIG. 8 shows signal waveforms for explaining the operation of the circuit shown in FIG. 7.

FIG. 7 shows a second embodiment of the noise reduction circuit according to the present invention. An input luminance signal a3 which includes a noise component and rises at a time t10 as shown in FIG. 8(A) is applied to an input terminal 50. As described before, the input luminance signal a3 is obtained by reproducing a frequency modulated signal from a recording medium and frequency-demodulating the reproduced frequency modulated signal, for example. The input luminance signal a3 is supplied to lowpass filters 51 and 52 and a delay circuit 53. The lowpass filter 51 has the impulse response characteristic G2(t) shown in FIG. 6B and produces a signal b3 shown in FIG. 8(B). A signal c3 shown in FIG. 8(C) is obtained from the delay circuit 53 which delays the input luminance signal a3 by a delay time dt. A subtracting circuit 54 subtracts the signal b3 from the signal c3 and produces a signal d3 shown in FIG. 8(D). A limiter 55 which has the same threshold level as the limiter 37 described before limits the amplitude of the signal d3 and produces a signal e3 shown in FIG. 8(E). The lowpass filter 51, the delay circuit 53, the subtracting circuit 54 and the limiter 55 constitute a first circuit. A subtracting circuit 56 subtracts the signal e3 from the signal c3 and produces a signal f3 shown in FIG. 8(F) which is supplied to an adder 57.

A lowpass filter 58 has the impulse response characteristic G1(t) shown in FIG. 6A, and produces a signal g3 shown in FIG. 8(G) from the signal c3. A subtracting circuit 59 subtracts the signal g3 from the signal c3 and produces a signal h3 shown in FIG. 8(H). A limiter 60 which has the same threshold level as the limiter 37 described before limits the amplitude of the signal h3 and produces a signal i3 shown in FIG. 8(I). The signal i3 is supplied to a subtracting circuit 61. The lowpass filter 58, the delay circuit 53, the subtracting circuit 59 and the limiter 60 constitute a second circuit.

The lowpass filter 52 has the impulse response characteristic G3(t) shown in FIG. 6C and produces a signal j3 shown in FIG. 8(J) from the input luminance signal a3. A subtracting circuit 62 subtracts the signal j3 from the signal c3 and produces a signal k3 shown in FIG. 8(K). A limiter 63 which has the same threshold level as the limiter 37 described before limits the amplitude of the signal k3 and produces a signal l3 shown in FIG. 8(L). The lowpass filter 52, the delay circuit 53, the subtracting circuit 62 and the limiter 63 constitute a third circuit. The subtracting circuit 61 subtracts the signal i3 from the signal l3 and produces a signal m3 shown in FIG. 8(M). The adder 57 adds the signal m3 and the signal f3 described before, and a luminance signal n3 shown in FIG. 8(N) which has been eliminated of the noise component and has no waveform distortion is produced from the adder 57 and is obtained via an output terminal 64. The delay circuit 53, the subtracting circuits 56 and 61, and the adder 57 constitute a fourth circuit.

Therefore, according to the present embodiment, the output signal e3 of the first circuit is subtracted from the delayed luminance signal c3 in the fourth circuit so as to obtain the signal f3. The signal f3 includes at the parts immediately before the edges thereof the noise component and the waveform distortion caused by the limiter 55. The second circuit produces the signal i3 from the delayed luminance signal c3, and this signal i3 is subtracted from the output signal l3 which is obtained from the third circuit so as to obtain the signal m3. The signals f3 and m3 are added so as to obtain the luminance signal n3 which has been eliminated of the noise component and has no waveform distortion. In other words, the fourth circuit carries out a subtraction between the input luminance signal and the output signal of the first circuit so as to obtain the signal f3 which is substantially eliminated of the noise component except for the noise component and distortion remaining at the parts immediately before the rise and immediately before the fall in the luminance signal caused by the limiter 51, carries out a subtraction between the output signals of the second and third circuits so as to obtain the signal m3 which includes the noise component and the waveform distortion of the signal f3 with the inverted phase, and adds the signals f3 and m3 so as to produce the luminance signal n3 which has been eliminated of the noise component and has no waveform distortion. Thus, the operation of the present embodiment is basically the same as that of the first embodiment described before.

Figure 9:
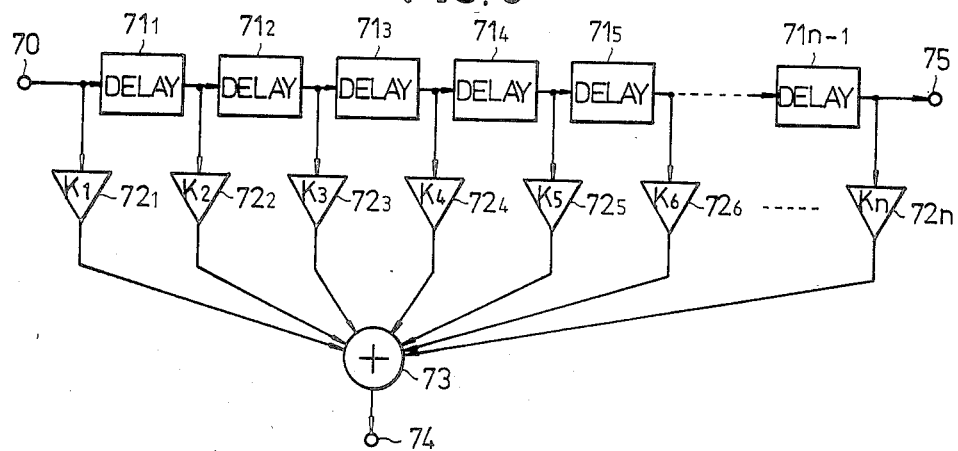
FIG. 9 is a system circuit diagram showing an embodiment of the lowpass filter in the circuits shown in FIGS. 4 and 7.

The lowpass filters 31, 32 and 33 of the first embodiment and the lowpass filters 51, 52 and 58 of the second embodiment may respectively be constituted by a transversal type filter shown in FIG. 9. In FIG. 9, the lowpass filter comprises n-1 delay circuits $71_1$ through $71_{n-1}$ coupled in series and each having a delay time DL, n coefficient multipliers $72_1$ through $72_n$ respectively for multiplying coefficients $K_1$ through $K_n$, and an adder 73. An input signal to the lowpass filter is applied to a terminal 70 and is supplied to the delay circuit $71_1$ and to the coefficient multiplier $72_1$. An output signal of an arbitrary delay circuit $71_i$ is supplied to a coefficient multiplier $72_{i+1}$, where i=1, 2, ..., n-1. Output signals of the coefficient multipliers $72_1$ through $72_n$ are supplied to the adder 73 which adds these signals, and an output signal of the adder 73 is obtained via a terminal 74 as an output signal of the lowpass filter. An output signal of the delay circuit $71_{n-1}$ is also obtained via a terminal 75.

Figure 10:
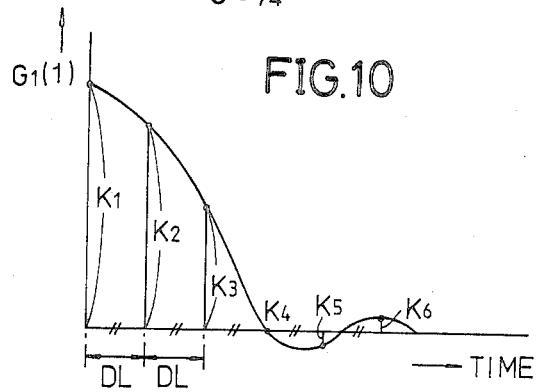
FIG. 10 is a diagram for explaining the constants in the circuit system shown in FIG. 9.

The coefficients $K_1$ through $K_n$ are set to appropriate values depending on the impulse response characteristic the lowpass filter is to have. For example, in the case of the lowpass filter 31 shown in FIG. 4, the coefficients $K_1$ through $K_n$ are set to appropriate values so that the lowpass filter 31 has the impulse response characteristic G1(t) shown in FIG. 6A. Hence, when n=6 in this case, the coefficients $K_1$ through $K_6$ of the coefficient multipliers $72_1$ through $72_6$ can be obtained by sampling the impulse response characteristic G1(t) shown in FIG. 6A with a sampling time DL as shown in FIG. 10.

The signal from the terminal 75 has been delayed by a time (n-1).DL by the delay circuits $71_1$ through $71_{n-1}$. Since this time (n-1).DL is equal to the delay time dt of the lowpass filter 32 in the case where the lowpass filter shown in FIG. 9 is used as the lowpass filter 32, it is possible to supply the signal from the terminal 75 to the subtracting circuits 40 and 41 in FIG. 4 instead of the output signal g2 of the delay circuit 36. Similarly, since the delay time of the lowpass filter 33 is equal to 2dt, an output signal of a delay circuit $71_{(n-1)/2}$ may be used instead of the signal g2 in the case where the lowpass filter shown in FIG. 9 is used as the lowpass filter 33. By taking such measures, it is possible to omit the delay circuit 36.

In the case where the lowpass filter shown in FIG. 9 is used as the lowpass filter 51 shown in FIG. 7, the signal from the terminal 75 may be used instead of the signal c3.

In the first and second embodiments described heretofore, the high frequency component of the input luminance signal a2 (or a3) is extracted in the first circuit by use of the lowpass filter 31 (or 58) and the subtracting circuit 34 (or 59). However, it is possible to extract the high frequency component of the input luminance signal in the first circuit by use of a highpass filter. In this case, a highpass filter may be used in each of the first through third circuits and the times in which the limiters in the first through third circuits carry out the amplitude limitation should be set identical to each other.

Figure 11:
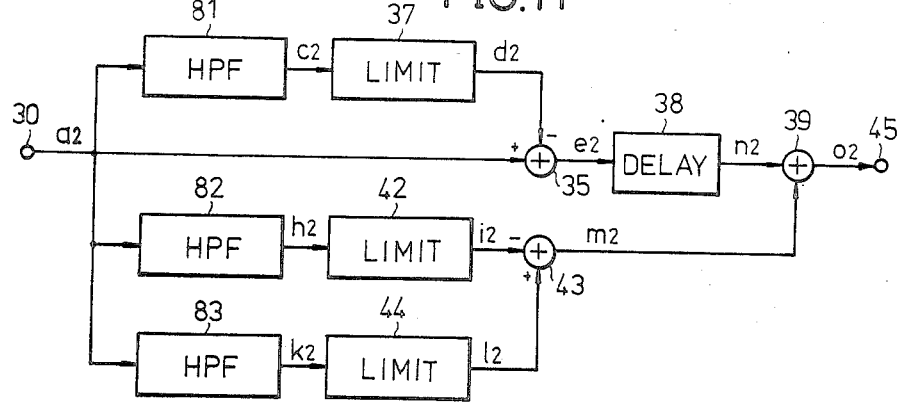
FIG. 11 is a system block diagram showing a third embodiment of the noise reduction circuit according to the present invention.

FIG. 11 shows a third embodiment of the noise reduction circuit according to the present invention in which a highpass filter is used to extract the high frequency component of the input luminance signal. In FIG. 11, those parts which are the same as those corresponding parts in FIG. 4 are designated by the same reference numerals, and description thereof will be omitted. In the present embodiment, a highpass filter 81 having an impulse response characteristic Ga(t) shown in FIG. 12A is used instead of the lowpass filter 31 and the subtracting circuit 34 shown in FIG. 4. A highpass filter 82 having an impulse response characteristic Gb(t) shown in FIG. 12B is used instead of the lowpass filter 32, the subtracting circuit 40 and the delay circuit 36 shown in FIG. 4. A highpass filter 83 having an impulse response characteristic Gc(t) shown in FIG. 12C is used instead of the lowpass filter 33, the subtracting circuit 41 and the delay circuit 36 shown in FIG. 4. Accordingly, the highpass filters 81, 82 and 83 respectively produce the signals c2, h2 and k2 shown in FIGS. 5(C), 5(H) and 5(K) from the input luminance signal a2. In the present embodiment, the highpass filter 81 and the limiter 37 constitute a first circuit, the highpass filter 82 and the limiter 42 constitute a second circuit, and the highpass filter 83 and the limiter 44 constitute a third circuit.

FIG. 13 shows a fourth embodiment of the noise reduction circuit according to the present invention in which a highpass filter is used to extract the high frequency component of the input luminance signal. In FIG. 13, those parts which are the same as those corresponding parts in FIG. 7 are designated by the same reference numerals, and description thereof will be omitted. In the present embodiment, a highpass filter 91 having the impulse response characteristic Gb(t) shown in FIG. 12B is used instead of the lowpass filter 51 and the subtracting circuit 54 shown in FIG. 7. A highpass filter 92 having the impulse response characteristic Ga(t) shown in FIG. 12A is used instead of the lowpass filter 58 and the subtracting circuit circuit 59 shown in FIG. 7. A highpass filter 93 having the impulse response characteristic Gc(t) shown in FIG. 12C is used instead of the lowpass filter 52 and the subtracting circuit 62 shown in FIG. 7. Accordingly, the highpass filters 91 and 93 respectively produce the signals d3 and k3 shown in FIGS. 8(D) and 8(K) from the input luminance signal a3, and the highpass filter 92 produces the signal h3 shown in FIG. 8(H) from the delayed luminance signal c3 obtained from the delay circuit 53. In the present embodiment, the highpass filter 91, the delay circuit 53 and the limiter 55 constitute a first circuit, the highpass filter 92, the delay circuit 53 and the limiter 60 constitute a second circuit, and the highpass filter 93, the delay circuit 53 and the limiter 63 constitute a third circuit.

Therefore, according to the embodiments described heretofore, it is possible to eliminate the noise component included in the input luminance signal by the first through fourth circuits, without generating waveform distortions at parts immediately before and after rises and falls in the input luminance signal.

In each of the embodiments described heretofore, the noise reduction circuit may be designed to carry out an analog signal processing or a digital signal processing on the input luminance signal. When carrying out the digital signal processing on the input luminance signal, an analog-to-digital converter is provided in a stage before the input terminal 30 or 50. When carrying out the signal processing on the input luminance signal in the noise reduction circuit digitally, the circuit can be mass produced with ease, and the signal processing is virtually unaffected by temperature changes and age.

Further, the present invention is not limited to these embodiments, and various variations and modifications may be made without departing from the scope of the present invention.

What is claimed is:

1. A noise reduction circuit for video signal comprising:

first circuit means supplied with an input video signal including a noise component, said first circuit means comprising a first filter circuit for obtaining from said input video signal a high frequency component including the noise component and a first limiter for limiting large amplitude parts of an output signal of the first filter circuit, said first filter circuit having a first impulse response characteristic;

second circuit means supplied with said input video signal, said second circuit means comprising a second filter circuit for obtaining from said input video signal a high frequency component including the noise component and a second limiter for limiting large amplitude parts of an output signal of the second filter circuit, said second filter circuit having a second impulse response characteristic wherein an amplitude increases or decays with time, said second impulse response characteristic being complementary to said first impulse response characteristic;

third circuit means supplied with said input video signal, said third circuit means comprising a third filter circuit for obtaining from said input video signal a high frequency component including the noise component and a third limiter for limiting large amplitude parts of an output signal of the third filter circuit, said third filter circuit having a third impulse response characteristic wherein an amplitude increases with time and thereafter decays with time, said third impulse response characteristic being essentially a combination of said first and second impulse response characteristics, said first through third limiters having identical threshold levels; and fourth circuit means supplied with said input video signal and output signals of said first through third circuit means for carrying out a subtraction between said input video signal and the output signal of said first circuit means so as to obtain a first signal which is substantially eliminated of the noise component except for a noise component and distortion remaining at parts in vicinities of rises and falls in the video signal caused by said first limiter, carrying out a subtraction between the output signals of the second and third circuit means so as to obtain a second signal which includes the noise component and the waveform distortion of said first signal with an inverted phase, and for adding said first and second signals so as to produce an output video signal which has been substantially eliminated of all the noise component.

2. A noise reduction circuit as claimed in claim 1 in which said first filter circuit comprises a first lowpass filter supplied with said input video signal and a first subtracting circuit for subtracting an output signal of the first lowpass filter from said input video signal and for supplying a resulting signal to said first limiter, said second filter circuit comprises a second lowpass filter supplied with said input video signal and a second subtracting circuit for subtracting an output signal of the second lowpass filter from the input video signal which has been delayed by a predetermined time and for supplying a resulting signal to said second limiter, and said third filter circuit comprises a third lowpass filter supplied with said input video signal and a third subtracting circuit for subtracting an output signal of the third lowpass filter from the input video signal which has been delayed by said predetermined time and for supplying a resulting signal to said third limiter.

3. A noise reduction circuit as claimed in claim 2 in which said second and third filter circuits comprise a delay circuit which is used in common for delaying said input video signal so as to obtain the input video signal which has been delayed by said predetermined time.

4. A noise reduction circuit as claimed in claim 1 in which said first, second and third filter circuits comprise first, second and third highpass filters, respectively.

5. A noise reduction circuit as claimed in claim 1 in which said fourth circuit means comprises a first subtracting circuit for subtracting the output signal of said first circuit means from said input video signal, a second subtracting circuit for subtracting the output signal of said second circuit means from the output signal of said third circuit means, a delay circuit for delaying an output signal of said first subtracting circuit by a predetermined time, and an adder for adding an output signal of said delay circuit and an output signal of said second subtracting circuit, said output video signal of said fourth circuit means being obtained from said adder.

6. A noise reduction circuit as claimed in claim 5 in which said first and second filter circuits have a delay time equal to said predetermined time, and said third filter circuit has a delay time equal to two times said predetermined time.

7. A noise reduction circuit as claimed in claim 1 in which said first filter circuit comprises a first lowpass filter supplied with said input video signal and a first subtracting circuit for subtracting an output signal of the first lowpass filter from the input video signal which has been delayed by a predetermined time and for supplying a resulting signal to said first limiter, said second filter circuit comprises a second lowpass filter supplied with the input video signal which has been delayed by said predetermined time and a second subtracting circuit for subtracting an output signal of the second lowpass filter from the input video signal which has been delayed by said predetermined time and for supplying a resulting signal to said second limiter, and said third filter circuit comprises a third lowpass filter supplied with said input video signal which has been delayed by said predetermined time and a third subtracting circuit for subtracting an output signal of the third lowpass filter from the input video signal which has been delayed by said predetermined time and for supplying a resulting signal to said third limiter.

8. A noise reduction circuit as claimed in claim 1 in which said fourth circuit means comprises a first subtracting circuit for subtracting the output signal of said first circuit means from the input video signal which has been delayed by a predetermined time, a second subtracting circuit for subtracting the output signal of said second circuit means from the output signal of said third circuit means, and an adder for adding output signals of said first and second subtracting circuits, said output video signal of said fourth circuit means being obtained from said adder.

9. A noise reduction circuit as claimed in claim 8 in which said first through fourth circuit means comprise a delay circuit which is used in common for delaying said input video signal so as to obtain the input video signal which has been delayed by said predetermined time.

10. A noise reduction circuit as claimed in claim 8 in which said first and second filter circuits have a delay time equal to said predetermined time, and said third filter circuit has a delay time equal to two times said predetermined time.

* * * * *